United States Patent [19]
Thibault et al.

[11] Patent Number: 5,791,607
[45] Date of Patent: Aug. 11, 1998

[54] PIPE SUPPORT SYSTEM

[76] Inventors: Jean Pierre Thibault, 50 Therrien, St. Mathieu de Beloeil, Quebec, Canada, J3G 4S5; Martin Boudreau, 147 Pyramid, Vimont, Laval, Quebec, Canada, H7M 2C1

[21] Appl. No.: 800,724

[22] Filed: Feb. 13, 1997

[51] Int. Cl.⁶ ............................................... E21F 17/02
[52] U.S. Cl. ........................... 248/58; 248/68.1; 403/105; 403/381
[58] Field of Search ..................... 248/58, 59, 65, 248/68.1, 62, 49; 403/381, 105, 106

[56] References Cited

U.S. PATENT DOCUMENTS

| | | | |
|---|---|---|---|
| 3,170,664 | 2/1965 | Carner | 248/59 |
| 3,495,796 | 2/1970 | Fruh | 248/59 X |
| 4,306,697 | 12/1981 | Mathews | 248/68.1 |
| 4,601,447 | 7/1986 | McFarland | 248/68.1 X |
| 4,618,114 | 10/1986 | McFarland | 248/68.1 X |

*Primary Examiner*—Ramon O. Ramirez
*Attorney, Agent, or Firm*—Eric Fincham

[57] ABSTRACT

A pipe support system which utilizes interconnecting pipe support members and mounting members, the support members having a longitudinally extending recess designed to receive and support at least one pipe, the pipe support members and mounting members being interconnected by a mortise and tenon arrangement on their respective side walls, and a hangar strap designed to fit within a slot in the mounting member and be adjustably retained by the interface of teeth. The assembly can be connected to support a number of different pipes from a hanging arrangement, a vertical surface arrangement or from a floor.

9 Claims, 7 Drawing Sheets

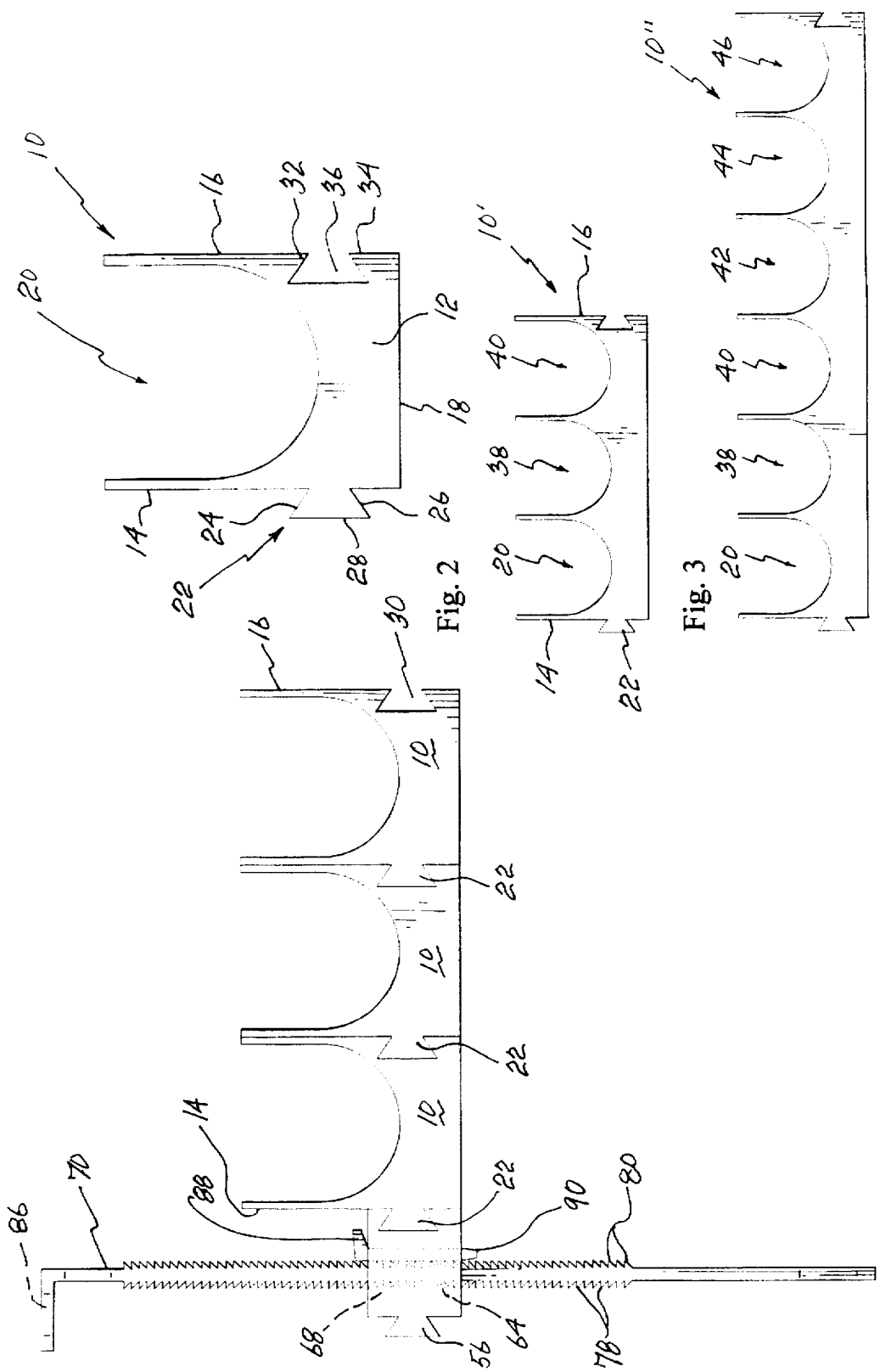

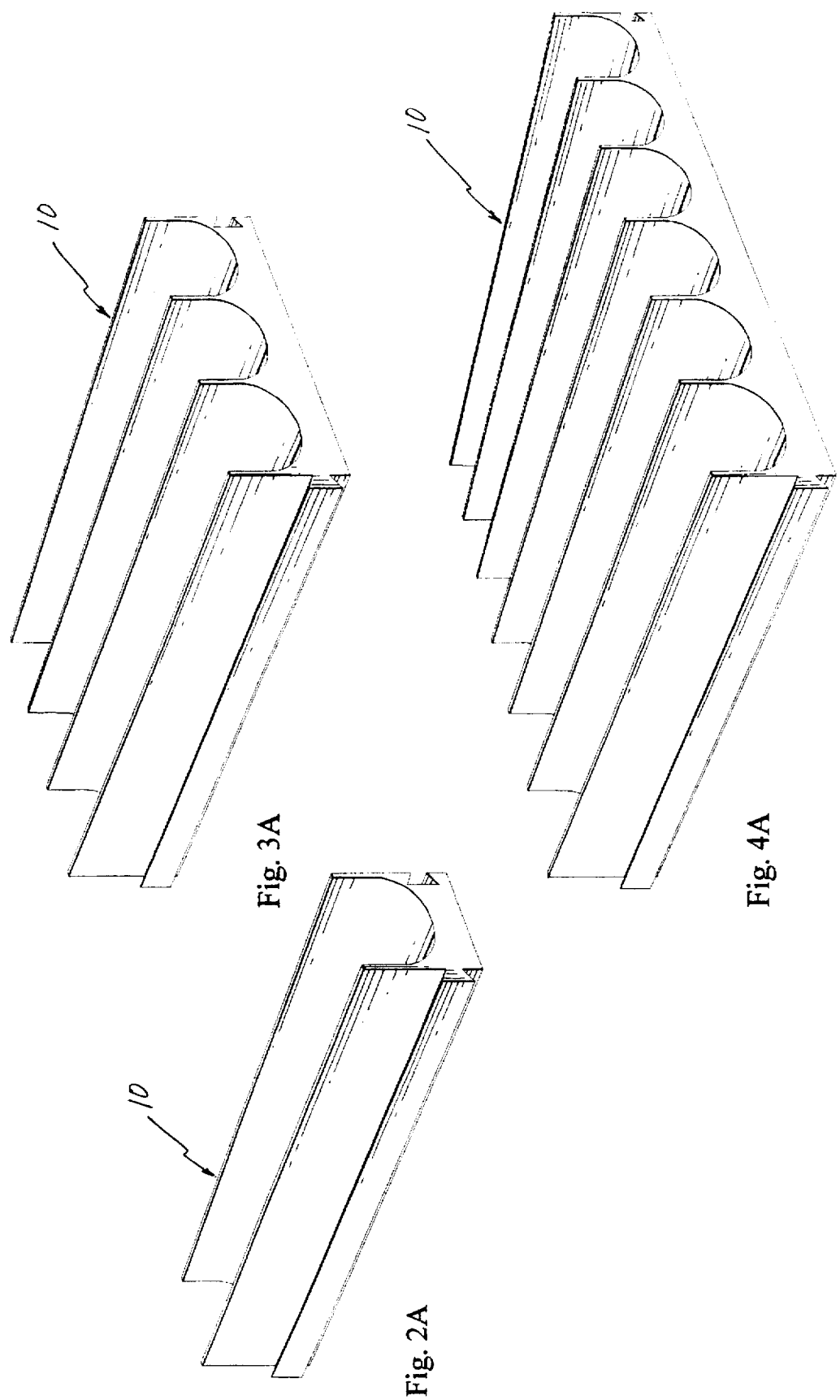

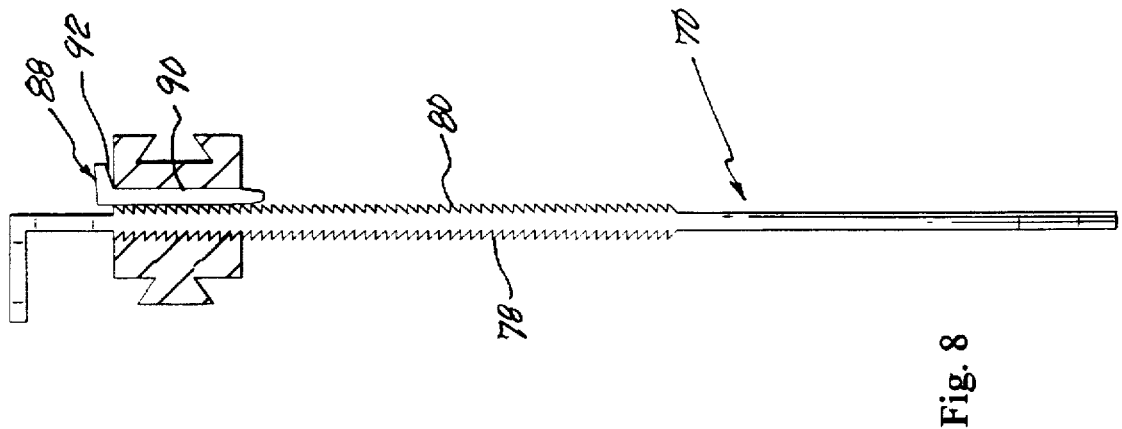
Fig. 8
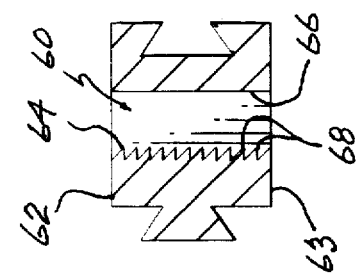
Fig. 6
Fig. 7
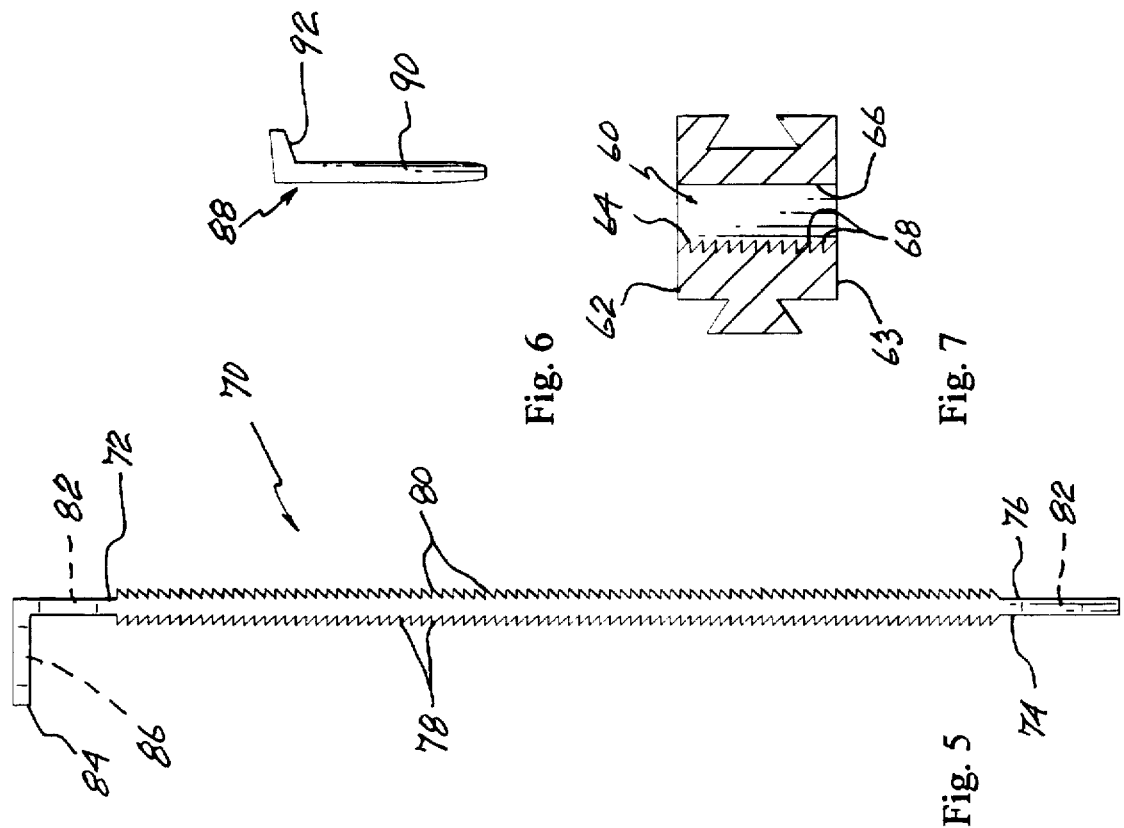
Fig. 5

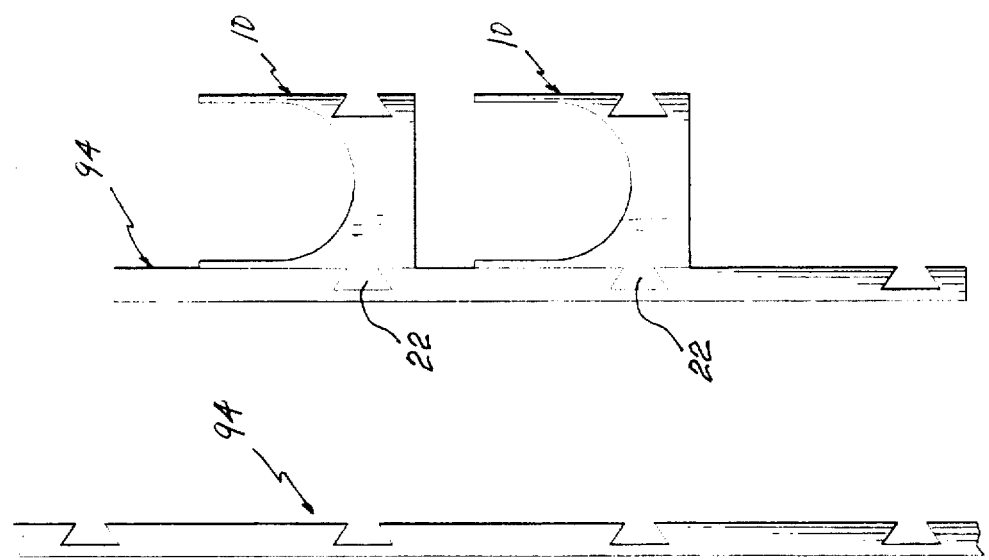
Fig. 13
Fig. 12
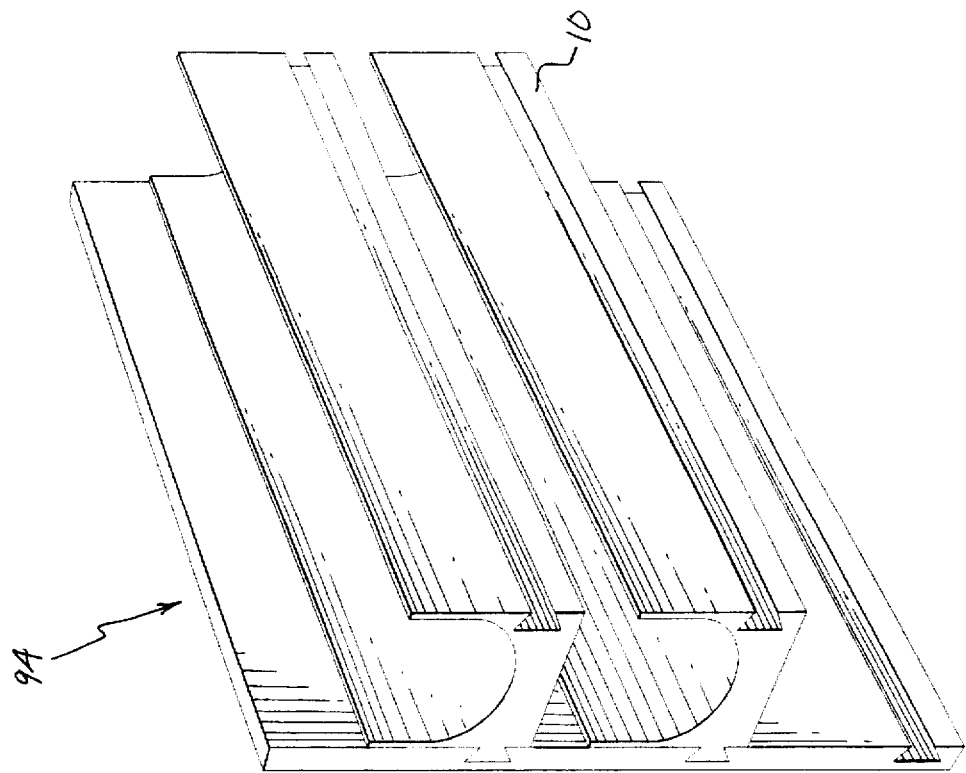
Fig. 11

PIPE SUPPORT SYSTEM

BACKGROUND OF THE INVENTION

The present invention relates to a pipe support system.

In the installation of pipes and the like in various types of buildings and in particular pipes associated with air conditioning, refrigeration and heating such as used in most commercial and industrial establishments, conventional practice is that the pipes are hung from the ceiling by strap hangers.

Commonly used strap hangers employed in the industry usually consist of a metal strap having apertures for fastening purposes and suffer from several disadvantages. Firstly, they must be installed individually and as such, the installation process is relatively labour intensive. Secondly, the hangers can lead to the rupturing of the pipes after a certain period of time. This frequently occurs due to movement of the pipe within the pipe and subsequent surface damage due to thermal expansion and contraction or vibration.

There have been various proposals in the art for pipe support systems to overcome the above disadvantages. Thus, it is shown in U.S. Pat. No. 2,273,571 that one may use a hangar construction which includes the use of a plurality of pipe holders which are moveably mounted on a fixed rail.

A multi level pipe support device is shown in U.S. Pat. No. 4,245,806 wherein there is provided a vertical threaded shaft to receive pipe support members of various configurations which are attachable thereto.

U.S. Pat. No. 4,925,136 shows a somewhat similar arrangement wherein there is provided a vertical threaded rod or shaft along with hanger members that may be secured thereto.

A system of threaded components for hanging and securing pipes from a support structure is also shown in U.S. Pat. No. 4,793,578. The general arrangement is similar to the previously discussed devices in that a vertical support rod is employed along with a plurality of connecting rods and support rings.

It is also known in the art to have a support structure for a plurality of tubes and which support structure may be supported from a base. Such an arrangement is shown in U.S. Pat. No. 4,384,697.

While the above prior art does show various types of supports for pipes or tubes or conduits, they frequently employe the use of threaded members and where a substantial amount of labour would be required for the installation.

SUMMARY OF THE INVENTION

It is an object of the present invention to provide a pipe support system which utilizes a minimum of "components" and tooling while being adaptable for many different size pipes and setups.

It is a further object of the present invention to provide a pipe support system which is economical to manufacture and easy to install.

It is a further object of the present invention to provide a pipe support system which may be used either to hang pipes or support them from a vertically extending wall member or support them from the floor.

According to one aspect of the present invention, there is provided a pipe support system comprising at least one pipe support member and at least one mounting member, the pipe support member comprising a body, the body having first and second side walls, at least one longitudinally extending recess formed in an upper portion of the body, the recess being sized to receive and support a pipe, the first side wall having a tenon thereon, the tenon extending in a direction parallel to a longitudinal axis of the recess, the second side wall having a mortise formed therein, the mortise extending in a direction parallel to the longitudinal axis of the recess, the mounting member having attaching means for attaching the mounting member to a further element, the mounting member having a mounting member body, a side wall on the mounting member body, the side wall having at least one of a tenon and mortise formed thereon, each of the tenons being sized to fit within the mortise in a sliding engagement therewith, the tenon and mortise having a geometrical configuration to permit relative longitudinal sliding movement therebetween while preventing withdrawal of the tenon from the mortice in a direction normal thereto.

In a further aspect of the present invention there is provided a support system comprising at least one pipe support member and at least two mounting members, the pipe support member comprising a body, the body having first and second side walls, at least one longitudinally extending U-shaped recess formed in an upper portion of the body, the recess being sized to receive and support a pipe, the first side wall having a tenon thereon, the tenon extending in a direction parallel to a longitudinal axis of the recess, the second side wall having a mortise formed therein, the mortise extending in a direction parallel to the longitudinal axis of the recess, each of the mounting members having a mounting member body, a side wall on the mounting member body, the side wall having at least one of a tenon and mortise formed thereon, each of the tenon being sized to fit within the mortise in a sliding engagement therewith.

BRIEF DESCRIPTION OF THE DRAWINGS

Having thus generally described the invention, reference will be made to the accompanying drawings illustrating an embodiment thereof, in which:

FIG. 1A is an end elevational view, partially in section, of a further embodiment pipe hanging system according to the present invention;

FIG. 2 is an end elevational view of an embodiment of a pipe support member according to the present invention;

FIG. 2A is a perspective view thereof;

FIG. 3 is an end elevational view of a further embodiment of a pipe support member;

FIG. 3A is a perspective view thereof;

FIG. 4 is an end elevational view of a still further embodiment of a pipe support member;

FIG. 4A is a perspective view thereof;

FIG. 5 is a side elevational view of a hanger member used in the pipe support system of the present invention;

FIG. 6 is a side elevational view of a locking member forming a portion of the pipe support system of the present invention;

FIG. 7 is a sectional view of a mounting member forming a portion of the pipe support system of the present invention;

FIG. 8 is a cross sectional view showing the assembly of the hanger of FIG. 5, the locking member of FIG. 6, and the mounting member of FIG. 7;

3

Figures 9, 10:
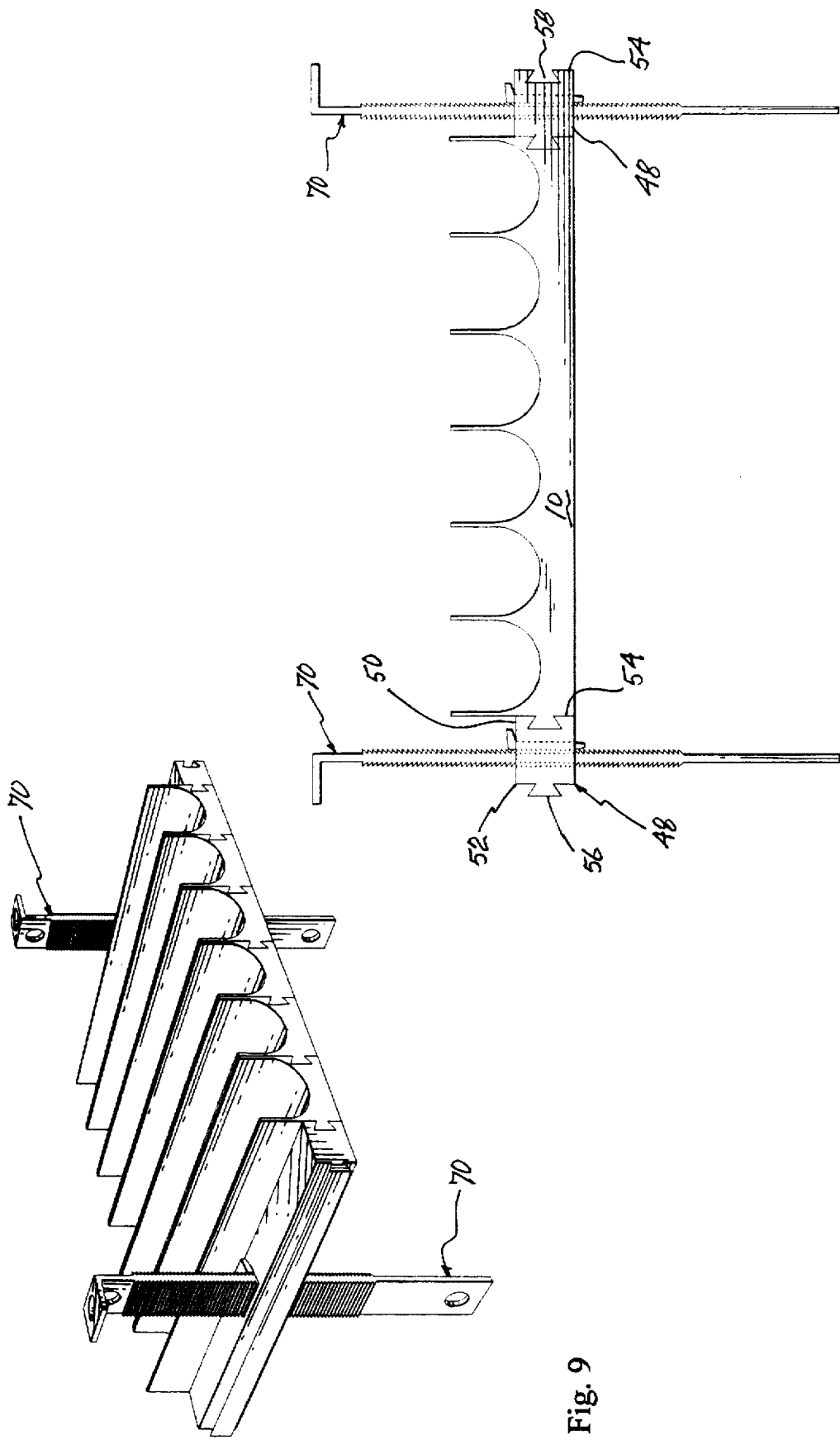
FIG. 9 is a perspective view of the complete assembly of one module of a pipe support assembly according to the present invention.
Figure 15:
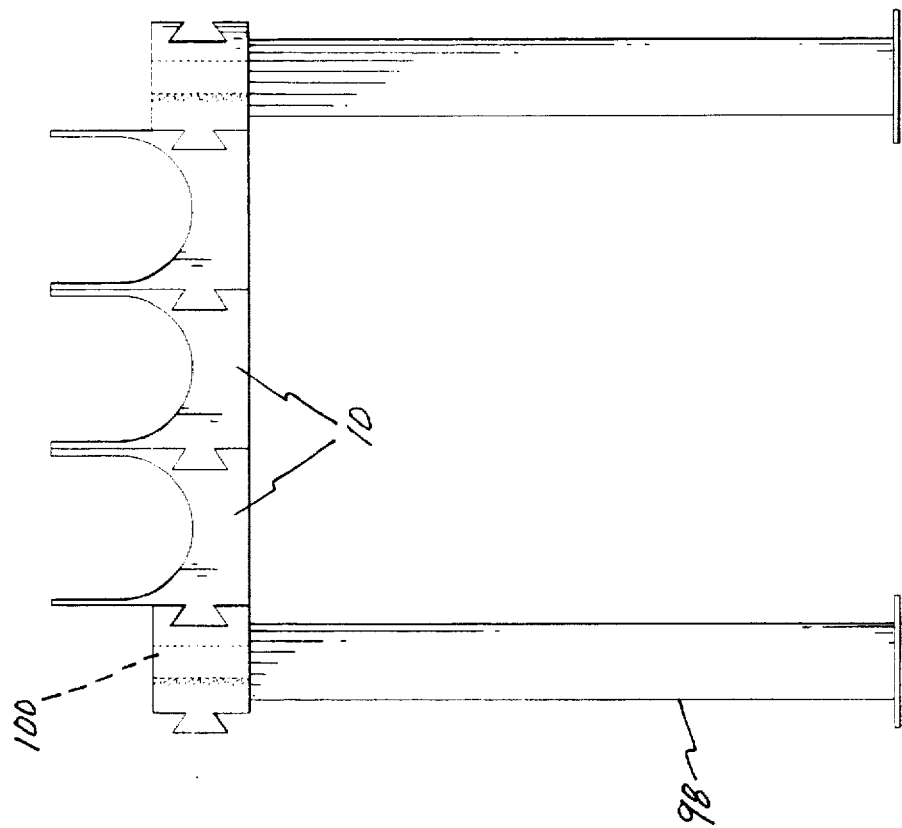
Figure 14:
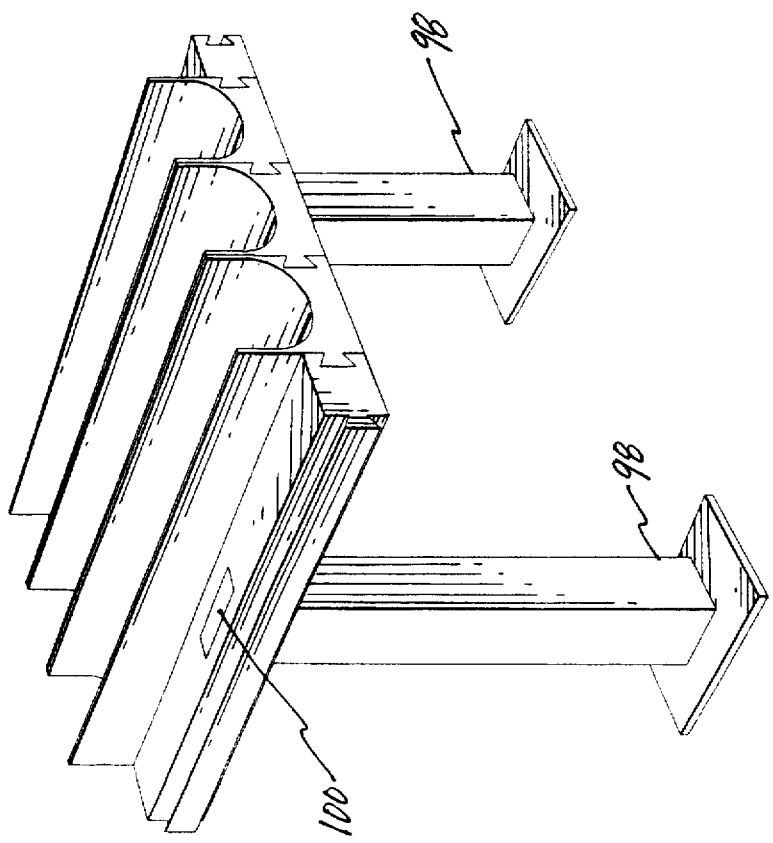

FIG. 10 is a cross sectional view thereof;

FIG. 11 is a perspective view of a further embodiment of a pipe support system according to the present invention;

FIG. 12 is a cross sectional view showing the mounting member of FIG. 11 attached to a vertical wall;

FIG. 13 is a cross sectional view illustrating a pipe support assembly mounted on a vertical wall;

FIG. 14 is a perspective view illustrating a further embodiment of the invention wherein a pipe support assembly is supported from a base; and FIG. 15 is a cross sectional view thereof.

DESCRIPTION OF THE PREFERRED EMBODIMENTS

Figure 1:
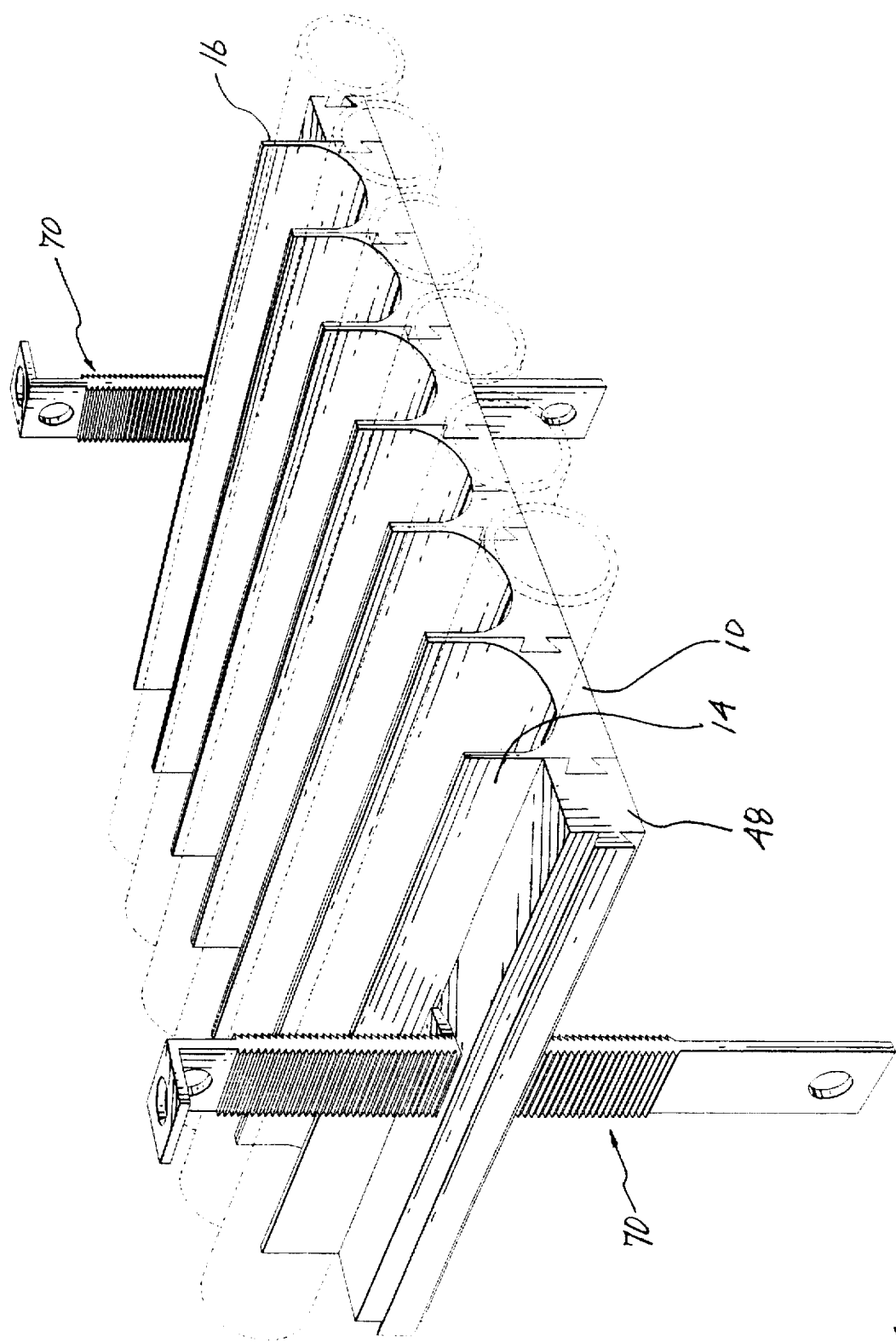
FIG. 1 is a perspective view of a pipe hanging system according to one embodiment of the present invention.

Referring to the drawings in greater detail, and by reference characters thereto, there is illustrated in FIGS. 1 and 1A an assembled pipe support system according to two different embodiments of the present invention. Each system includes three different component types which will now be described in detail.

FIGS. 2, 2A, 3, 3A, 4 and 4A illustrate a first component—a pipe support member. A first embodiment is illustrated in FIGS. 2 and 2A wherein a pipe support member 10 has a body portion 12. Body portion 12 has a first side wall 14, a second side wall 16 and a bottom wall or base 18. A U-shaped longitudinally extending recess 20 is formed in the upper wall between side walls 14 and 16.

A tenon 22 extends along side wall 14 in a direction substantially parallel to the longitudinal axis of U-shaped recess 20. Tenon 22 is formed to have a trapezoidal configuration defined by a first outwardly extending wall 24, a second outwardly extending wall 26 and a side wall 28.

Formed within body 12 at side wall 16 is a mortise generally designated by reference numeral 30. Mortise 30 also has a trapezoidal configuration defined by a first inwardly angled wall 32, a second inwardly angled wall 34, and a side wall 36. Mortise 30 extends along side wall 16 in a direction substantially parallel to tenon 22. Mortise 30 is sized to receive tenons such as tenon 22. In the illustrated embodiment of FIGS. 2 and 2A, pipe support member 10 is adapted to receive a pipe within U-shaped recess 20.

In the embodiment of FIGS. 3 and 3A, pipe support member 10' has both a second recess 38 and a third recess 40 in addition to U-shaped recess 20. Recesses 20, 38 and 40 extend parallel to each other and the arrangement permits the support of three pipes using a single pipe support member.

Referring to the embodiment illustrated in FIGS. 4 and 4A, there is shown a modified pipe support member 10". Pipe support member 10", in addition to recesses 20, 38 and 40, has three additional U-shaped recesses 42, 44 and 46. Thus a single pipe support member 10" can support six pipes in a parallel manner.

It will be noted that in both the embodiments of FIGS. 3 and 4, a tenon 22 and mortice 30 is provided on wall 14 and 16 respectively in the manner described with respect to FIG. 2.

The pipe support system of the present invention includes the use of a mounting member 48 and which mounting member 48 is illustrated in FIG. 7.

Mounting member 48 includes a body 50 having a pair of side walls 52 and 54. On side wall 52 there is provided a tenon 56 in a manner identical to that described with respect to pipe support member 10. Similarly, a mortice 58 extends along a side wall 54.

4

Formed within body 50 and extending from a top wall 62 to a bottom wall 63 thereof is a slot generally designated by reference numeral 60. Slot 60 is partially defined by a first slot side wall 64 and a second slot side wall 66. As may be seen, slot side wall 64 includes a plurality of teeth 68 formed thereon for reasons which will become apparent hereinbelow.

A further component of the pipe hanger system of the present invention comprises a hanger 70 which is illustrated in FIG. 5. Hanger 70 includes a substantially rectangularly shaped body 72 having a pair of major side walls 74 and 76. Each side wall 74 and 76 has teeth 78 and 80 respectively formed thereon. Apertures 82 are formed in body 72 above and below teeth 78, 80.

Hanger 70 also includes a horizontal portion 84 having an aperture 86 formed therein to permit attachment of the hanger to a horizontal surface.

A locking member is illustrated in FIG. 6 and which locking member 88 comprises a shaft portion 90 and a handle portion 92.

In one type of installation as shown in FIG. 1A, hanger 70 may be secured to a horizontal member or surface by means of a suitable attachment member secured through aperture 86. Mounting member 48 may then be placed in position with respect to hanger 70 by engagement of teeth 78 of hanger 70 with teeth 68 formed on slot side wall 64. At the desired positioning, locking member 88 may have shaft 90 inserted in the gap remaining between hanger body 72 and slot side wall 66.

Subsequently, individual pipe support members may be connected to mounting member 48 by engagement of the tenon and mortise arrangement.

Naturally, it will be understood that the individual pipe support members 10 may be engaged with mounting member 48 prior to placement of mounting member 48 on hanger 70.

A modified arrangement is illustrated in FIG. 1 wherein a pair of mounting members 48 are mounted on side walls 14 and 16 of pipe support member 10". A pair of hangers 70 are engaged with mounting members 48.

A further embodiment of the invention is illustrated in FIGS. 11, 12 and 13 wherein pipe support member 10 is held in position by a mounting member 94 securable to a fixed wall 96. The same type of tenon and mortise arrangement is employed.

A still further embodiment of the invention is illustrated in FIGS. 14 and 15 wherein a post 98 extends upwardly from a surface such as a floor and which post has a tenon 100 adapted to fit within slot 60 for support.

It will be understood that the above described embodiments are for purposes of illustration only and that changes and modifications may be made thereto without departing from the spirit and scope of the invention.

We claim:

1. A pipe support system comprising at least one pipe support member and at least one mounting member, said pipe support member comprising a body, said body having first and second side walls, at least one longitudinally extending recess formed in an upper portion of said body, said recess being sized to receive and support a pipe, said first side wall having a tenon thereon, said tenon extending in a direction parallel to a longitudinal axis of said recess, said second side wall having a mortise formed therein, said mortise extending in a direction parallel to said longitudinal axis of said recess, said mounting member having attaching means for attaching said mounting member to a further element, said mounting member having a mounting member body, a side wall on said mounting member body, said side wall having at least one of a tenon and mortise formed thereon, each of said tenons being sized to fit within one of said mortises in a sliding engagement therewith, each of said tenons and mortises having a geometrical configuration to permit relative longitudinal sliding movement therebetween while preventing withdrawal of said tenons from said mortises in a direction normal thereto, said mounting member body including a slot extending therethrough, at least one internal wall surrounding said slot, said internal wall having at least one tooth formed thereon, a hanger, said hanger having means located at one end thereof to attach said hanger to a support surface, said hanger body having a plurality of teeth formed thereon designed to engage said at least one tooth on said internal wall of said slot, and a locking member, said locking member being sized to fit within said slot to lock said hanger body in a desired position within said slot.

2. The system of claim 1 further including a plurality of said pipe support members, said pipe support members being interconnected at their side walls by one of said tenons and mortises.

3. The system of claim 2 further including a second mounting member, each of said mounting members being located at opposite ends of said plurality of pipe support members.

4. The system of claim 1 wherein said body of said pipe support member includes a plurality of longitudinally extending recesses formed in an upper portion of said body, said plurality of longitudinally extending recesses being substantially parallel to each other.

5. The system of claim 4 wherein each of said recesses has a generally U-shaped cross sectional configuration.

6. The system of claim 1 wherein said attaching means for attaching said mounting member to a further element comprises means to receive a support member mounted on a base.

7. The system of claim 1 wherein said attaching means for attaching said mounting member comprises means for attaching said mounting member to a vertical surface.

8. The system of claim 7 wherein said side wall of said mounting member includes a plurality of at least one of a tenon and mortise formed thereon such that a plurality of said pipe support member may be mounted on said mounting member in a vertical relationship to each other.

9. A pipe support system comprising at least one pipe support member and at least two mounting members, said pipe support member comprising a body, said body having first and second side walls, at least one longitudinally extending U-shaped recess formed in an upper portion of said body, said recess being sized to receive and support a pipe, said first side wall having a tenon thereon, said tenon extending in a direction parallel to a longitudinal axis of said recess, said second side wall having a mortise formed therein, said mortise extending in a direction parallel to said longitudinal axis of said recess, each of said mounting members having a mounting member body, a side wall on each of said mounting member bodies, each of said side walls having at least one of a tenon and mortise formed thereon, each of said tenons being sized to fit within one of said mortises in a sliding engagement therewith, each of said mounting members having an internal slot extending therethrough, said internal slots each having teeth formed on one surface thereof, a hanger designed to extend through each of said slots, each of said hangers having a plurality of teeth formed thereon to engage said teeth on said surface of said slots, and a locking member associated with each hanger, each of said locking members being sized to fit within a respective slot to lock a respective hanger in a desired position within said slot.

* * * * *